(12) United States Patent
Tsai

(10) Patent No.: US 6,446,942 B1
(45) Date of Patent: Sep. 10, 2002

(54) COOLING TOWER

(76) Inventor: Ming-Kun Tsai, No. 105, Chung Yang Road, Chiu Chiung Village, Lin Nei Hsiang, Yunlin Hsien (TW)

( * ) Notice: Subject to any disclaimer, the term of this patent is extended or adjusted under 35 U.S.C. 154(b) by 0 days.

(21) Appl. No.: 09/846,416

(22) Filed: May 2, 2001

(51) Int. Cl.$^7$ .................................................. B01F 3/04
(52) U.S. Cl. ..................... 261/156; 261/28; 261/115; 261/DIG. 11
(58) Field of Search .............................. 261/28, 30, 115, 261/147, 156, DIG. 11

(56) References Cited

U.S. PATENT DOCUMENTS 3,898,867 A * 8/1975 Andersson et al. .......... 261/156
4,366,106 A * 12/1982 Benyak et al. .............. 261/156
4,648,441 A * 3/1987 Van de Sluys et al. ..... 261/156
6,032,932 A * 3/2000 Sixsmith .................... 261/156

* cited by examiner

Primary Examiner—C. Scott Bushey
(74) Attorney, Agent, or Firm—Rosenberg, Klein & Lee

(57) ABSTRACT

A cooling tower has cooling tubes fitted to a water tank with upper portions sticking out from a top side of the tank. The upper portions of the cooling tubes have radiating fins. A frame is disposed on the top of the tank with aerosols being fitted to an inner upper side, and with two opposing fans fitted to two lateral sides. Hot water is sent through the tank to contact the lower portions of the cooling tubes such that same is cooled down by cooling spray distributed onto the radiating fins, and cooling air sent into, and out of the frame by the fans.

1 Claim, 2 Drawing Sheets

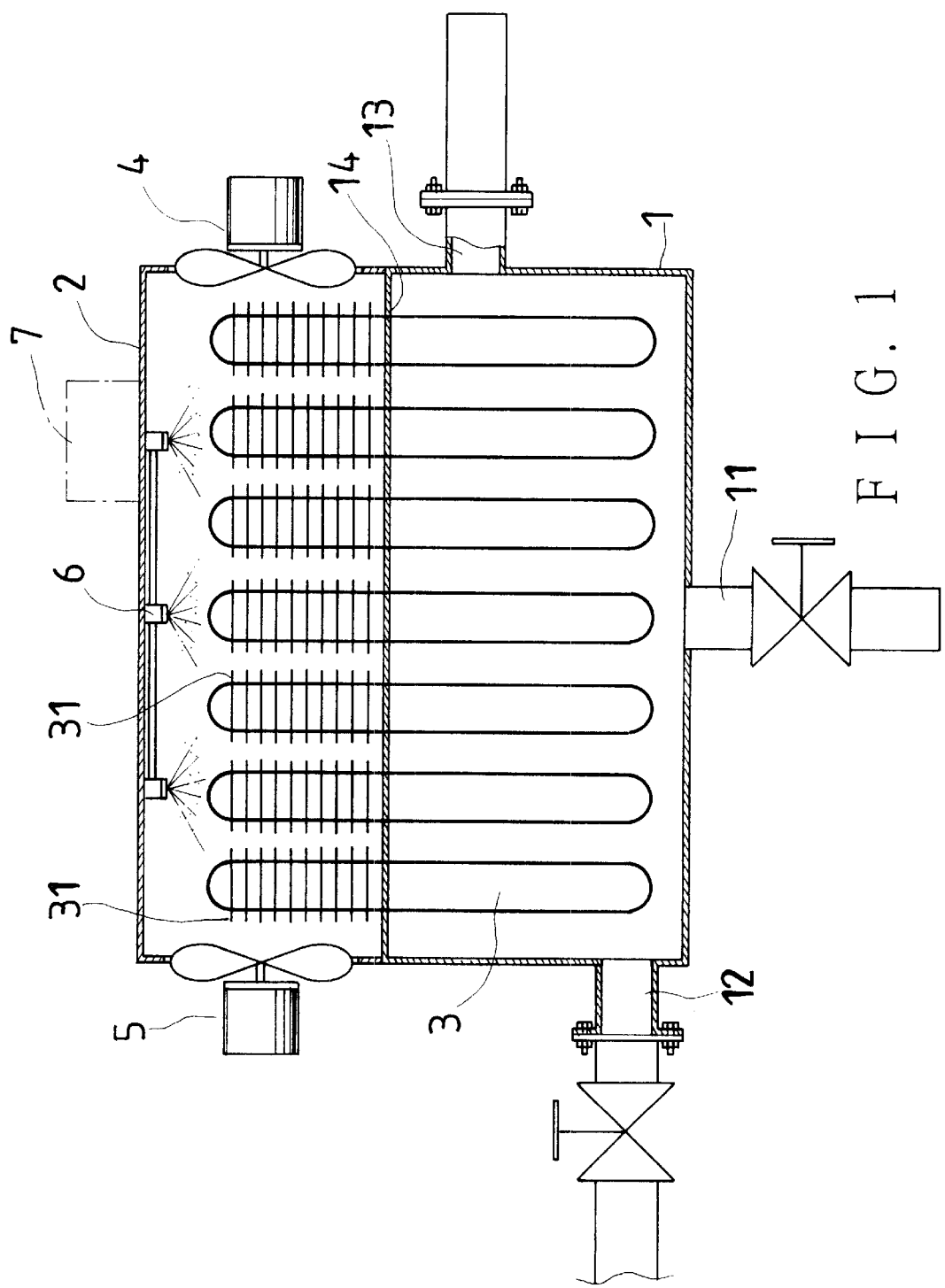
F I G. 1

COOLING TOWER

BACKGROUND OF THE INVENTION

The present invention relates to a cooling tower, and particularly to one which has relatively good cooling effect.

Referring to FIG. 2, a conventional cooling tower has a tower body 10, a water pump 20, a tube 30, a pipe 40, cooling boards 50 and an electric fan 60.

The tower body 10 has a water outlet 101 on a lower side. The water pump 20 is disposed in the tower body 10, and is connected with a pipe (not numbered) for hot water; the tube 30 is pivotally connected to a water outlet of the water pump 20 from a lower end, and perpendicularly connected to the middle part of the pipe 40. The pipe 40 has holes 401 on the lower side.

The electric fan 60 is disposed in an upper part of the tower part 10. The cooling boards 50 have wave-like surfaces, and are disposed in the tower body 10 under the pipe 40.

Hot water is pumped into the pipe 40 through the tube 30 by means of the water pump 20 to flow through the holes 401 to the cooling boards 50; the electric fan 60 makes air blow to cool the hot water, the blowing air also makes the pipe 40 pivoted on the tube distribute the hot water. Thus, the hot water is cooled, and finally flows out through the water outlet 101.

However, the cooling tower is found to have very limited cooling effect after same is put to use.

SUMMARY OF THE INVENTION

Therefore, it is a main object of the present invention to provide an improvement on the conventional cooling tower in order to have a relatively good cooling effect on water.

The cooling tower has several cooling tubes fitted to a water tank with the upper portions sticking out from the top side of the water tank. The upper portions of the cooling tubes have cooling fins fitted thereto.

A frame is disposed in the top side of the water tank. Several aerosols are fitted to an inner upper side of the frame. And, a first and a second electric fans are fitted to two sides of the frame, opposing each other such that cooling air can be sent into the frame by means of the first fan, and sent out by means of the second fan after having passed over the radiating fins.

When hot water is sent through the water tank to contact the lower portions of the cooling tubes, same is cooled down by cooling spray from the aerosols and cooling air sent into the frame with the first fan.

BRIEF DESCRIPTION OF THE DRAWINGS

This invention will be better understood by referring to the accompanying drawings, wherein:

FIG. 1 is a plan view of the cooling tower of the present invention.

DETAILED DESCRIPTION OF THE PREFERRED EMBODIMENT

Figure 2:
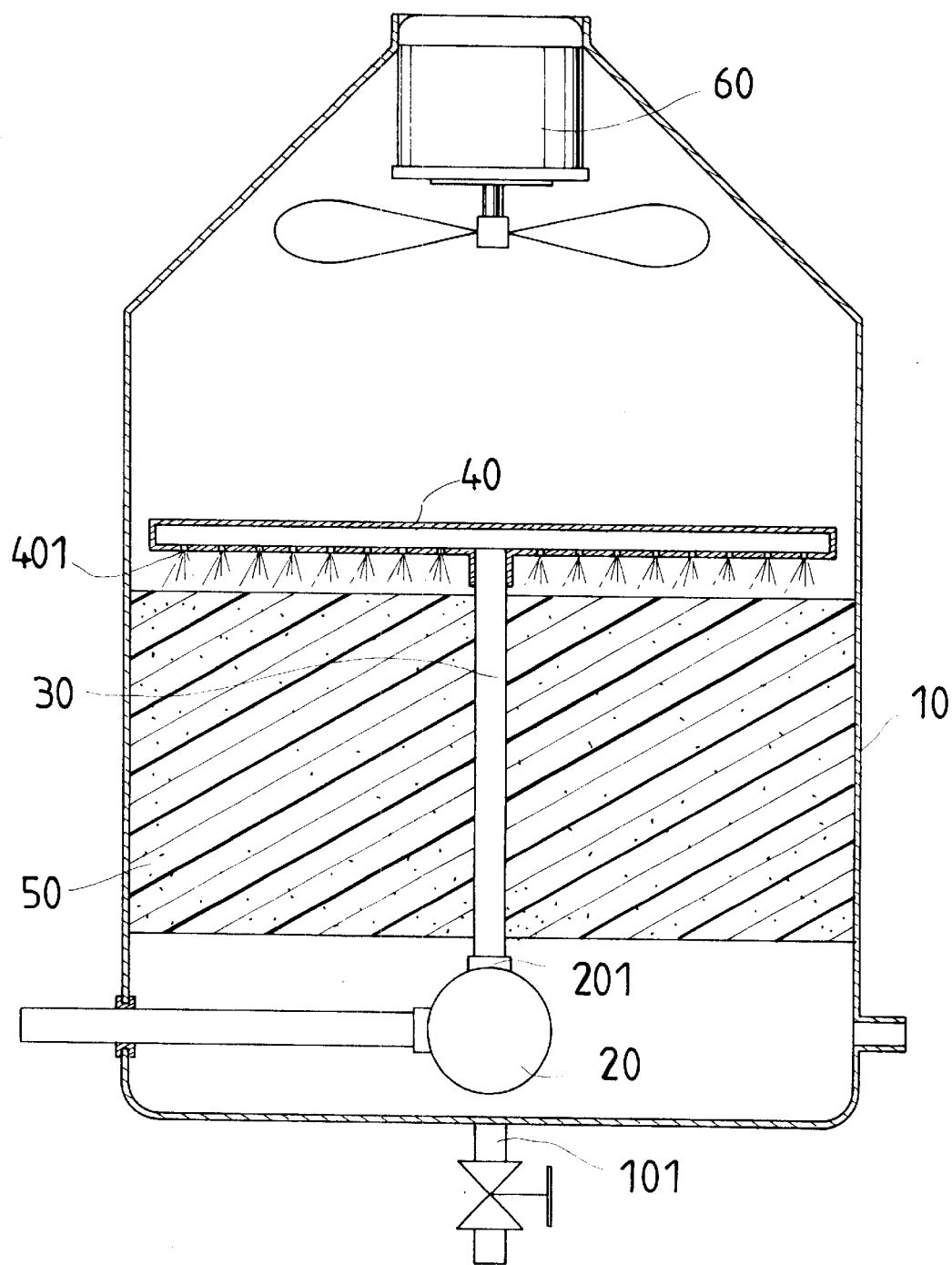
FIG. 2 is a plan view of the conventional cooling tower in the Background.

Referring to FIG. 1, a cooling tower of the present invention includes a water tank 1, a frame 2, several cooling tubes 3, a first electric fan 4, a second electric fan 5, aerosols 6 and a water pump 7.

The water tank 1 has a water inlet 12, a water outlet 13, and a hole 11 used in cleaning. The water tank 1 further has through holes 14 on an upper side.

The frame is disposed on the top of the water tank 1 with the electric fans 4 and 5 fitted to two sides opposing each other. The first electric fan 4 is provided to blow air into the frame 2 while the second one 5 is provided to blow air out of the frame 2.

The aerosols 6 are disposed on the inner side of the top of the frame 2, and connected to the water pump 7 to make cooling water from the water pump 7 become spray.

The cooling tubes 3 are passed through the through hole 14 of the water tank 1 with upper portions being disposed in the frame 2 and lower portion being disposed in the tank 1. Radiating fins 31 are fitted to the upper portions of the cooling tubes 3.

In using the cooling tower, hot water is sent into the tank I from the water inlet 12 to connect the lower portions of the cooling tube 3; thus, heat is sent from the lower portions to the upper portions of the cooling tubes 3 and radiating fins 31. And, the aerosols 6 distribute cooling spray on the radiating fins 31 and the upper portions of the cooling tubes 3. The first electric fan 4 blows cool air into the frame 2 onto the radiating fins 31 and the cooling tubes 3. The second electric fan 5 blows air out of the frame 2 after the air has become hotter due to contact with the radiating fins 31 and the cooling tube 3.

Thus, the hot water has become relatively cool when it flows out of the tank 1 from the water outlet 13.

From the above description, the cooling tower can be known to have desirable cooling effect with the electric fans making air blow in and out in relatively much amount, and with the aerosols making cooling water become spray to help the radiating fins to cool down.

What is claimed is:

1. A cooling tower, comprising
    a plurality of cooling tubes passed through a top side of a water tank with radiating fins fitted to upper portions of said cooling tubes outside said tubes;
    a plurality of aerosols fitted to an inner upper side of a frame disposed on said top side of said tank; said aerosols being connected to a water pump to make cooling water from said pump become spray form to distribute same onto said radiating fins;
    a first and a second electric fan fitted to two sides of said frame opposing each other; said first fan being capable of blowing cooling air into said frame and said second fan blows same out after same has flew through said frame; whereby hot water is cooled down to flow out of said tank through an outlet on said tank after having passed through said tank to contact lower portions of said cooling tubes.

* * * * *